INDUCTIVELY CONTROLLED CARD READING

Filed Nov. 26, 1957 2 Sheets-Sheet 1

INVENTOR.
EDWARD J. RABENDA

BY
Brumbaugh, Free, Graves & Donohue
his ATTORNEYS.

July 10, 1962 E. J. RABENDA 3,043,504

INDUCTIVELY CONTROLLED CARD READING

Filed Nov. 26, 1957 2 Sheets-Sheet 2

INVENTOR.
EDWARD J. RABENDA

BY

Brumbaugh, Free, Graves & Donohue his ATTORNEYS.

United States Patent Office 3,043,504

Patented July 10, 1962

3,043,504

INDUCTIVELY CONTROLLED CARD READING

Edward J. Rabenda, Poughkeepsie, N.Y., assignor to International Business Machines Corporation, New York, N.Y., a corporation of New York Filed Nov. 26, 1957, Ser. No. 699,080
12 Claims. (Cl. 235—61.11)

This invention relates to card reading devices and, more particularly to a card reader utilizing magnetic elements energized through perforations punched in the cards.

Information recorded in coded form on punched cards and the like is customarily represented character by character in a series of transverse columns wherein one or more perforations are entered at selected positions in a column to represent a character according to a predetermined code. A typical card may contain, for example, eighty columns each having twelve positions at which perforations may be punched, thus being capable of storing eighty characters or 960 information bits.

Conventional apparatus for reading information recorded on such cards frequently includes a column of brush contacts adapted to detect perforations at each position in a card column and a rotating contactor arranged to energize the brushes in sequence, thus reading out the information in each column in serial form. Operation of card readers of this type necessarily requires a relatively long time interval to read each column and, in order to convert the serial character information from one code to another, an intermediate storage device must be utilized.

Accordingly, it is an object of this invention to provide a high speed card reader wherein coded information recorded on cards is detected by magnetic elements.

Another object of the invention is to provide a card reader of the above character wherein the information bits comprising a character code may be detected simultaneously.

A further object of the invention is to provide a card reader capable of converting character information from one code to another without intermediate storage of the information bits.

These and other objects of the invention are attained by inductively linking the brush contacts associated with corresponding information bit positions in several card columns with a single output device and energizing all the brushes in each column simultaneously. Conversion of the information from the card code to another code is accomplished by providing an output device for each position or channel of the second code and inductively linking the appropriate brush contacts in each column with the output devices corresponding to the information positions representing the same character in the new code.

In one embodiment of the invention, the card reader is arranged to translate recorded information from the card code to a magnetic tape code at high speed, thus permitting continuous recording of the information on a magnetic tape. Another arrangement utilizes the card reader to translate card information to a magnetic tape code and simultaneously compare it with a tape bearing the same information.

Further objects and advantages of the invention will be apparent from a reading of the following description in conjunction with the accompanying drawings in which.

Figure 1:
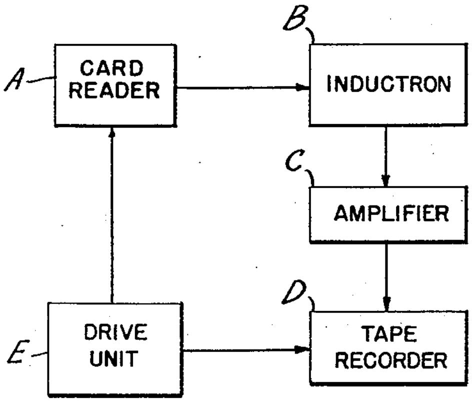
FIG. 1 is a block diagram illustrating a system for recording punched card information on magnetic tape according to the invention.

In the block diagram of FIG. 1 a system for recording punched card information on magnetic tape is shown wherein a card reader A, arranged according to the invention as described below, transmits signals representing information characters in the card code to a unit B containing a group of magnetic elements capable of detecting the card code signals and translating them to another code which will hereinafter be called an inductron. Converted code signals from the inductron B, which is described in detail below, are amplified in the usual manner by an amplifier C and applied to a conventional recorder such as a magnetic tape recorder D. In order to maintain synchronism between the card reader A and the tape recorder D, a drive unit E of conventional design is adapted to control the operation of both these units in the customary manner.

Figure 2:
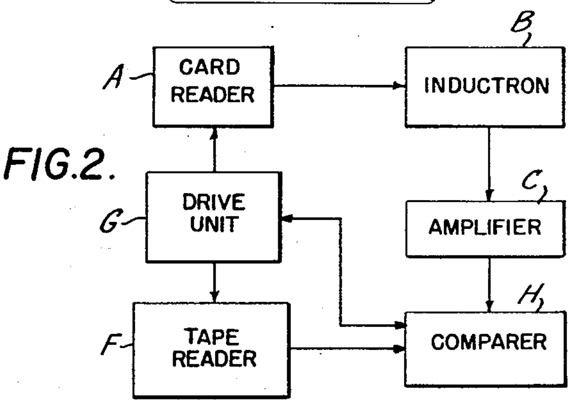
FIG. 2 is a block diagram showing the arrangement of apparatus for comparing information recorded on punched cards and on magnetic tape.

In the system illustrated in FIG. 2, the card reader A and a conventional tape reader F are synchronously driven by a similar drive unit G and card code signals detected by the inductron B are converted to the code signals utilized in the magnetic tape code to represent the same characters. After amplification by the amplifier C the translated code signals are compared with those from the tape reader F by a comparer H which may be of any well-known design. Inconsistencies between the signals as determined by the comparer may be utilized, for example, to control the drive unit G so that the card reader A and the tape reader F are reversed and the erroneous tape record is erased in the usual way.

Figure 3:
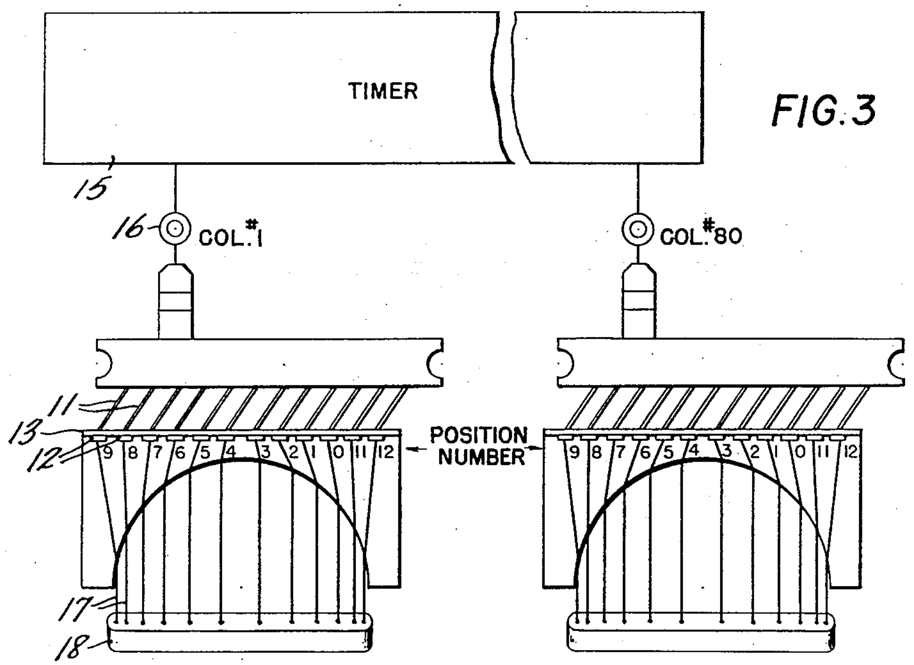
FIG. 3 is a schematic view illustrating a portion of the card reader.
Figure 4:
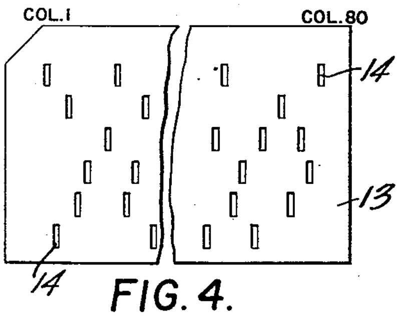
FIG. 4 illustrates a typical punched card on which information is recorded in coded form.

As shown in FIGS. 3 and 4, the card reader A includes a series of brushes 11, each adapted to engage a corresponding contact element 12 through a perforation in a punched card 13 inserted therebetween. As best seen in FIG. 4, a typical card 13 may include eighty character columns, each having twelve positions at which perforations 14 may be punched, the sequence of positions being commonly represented by the numerical series "12, 11, 0, 1, 2, 3, 4, 5, 6, 7, 8, 9." Perforations in each of the eighty columns of the card 13 are sensed by eighty identical columns of brushes 11 and associated contact elements 12, the various columns of brushes being energized in sequence by electrical pulses from a timer 15 comprising conventional circuit breakers, for example, applied to all the brushes in any column through a terminal 16.

Figure 5:
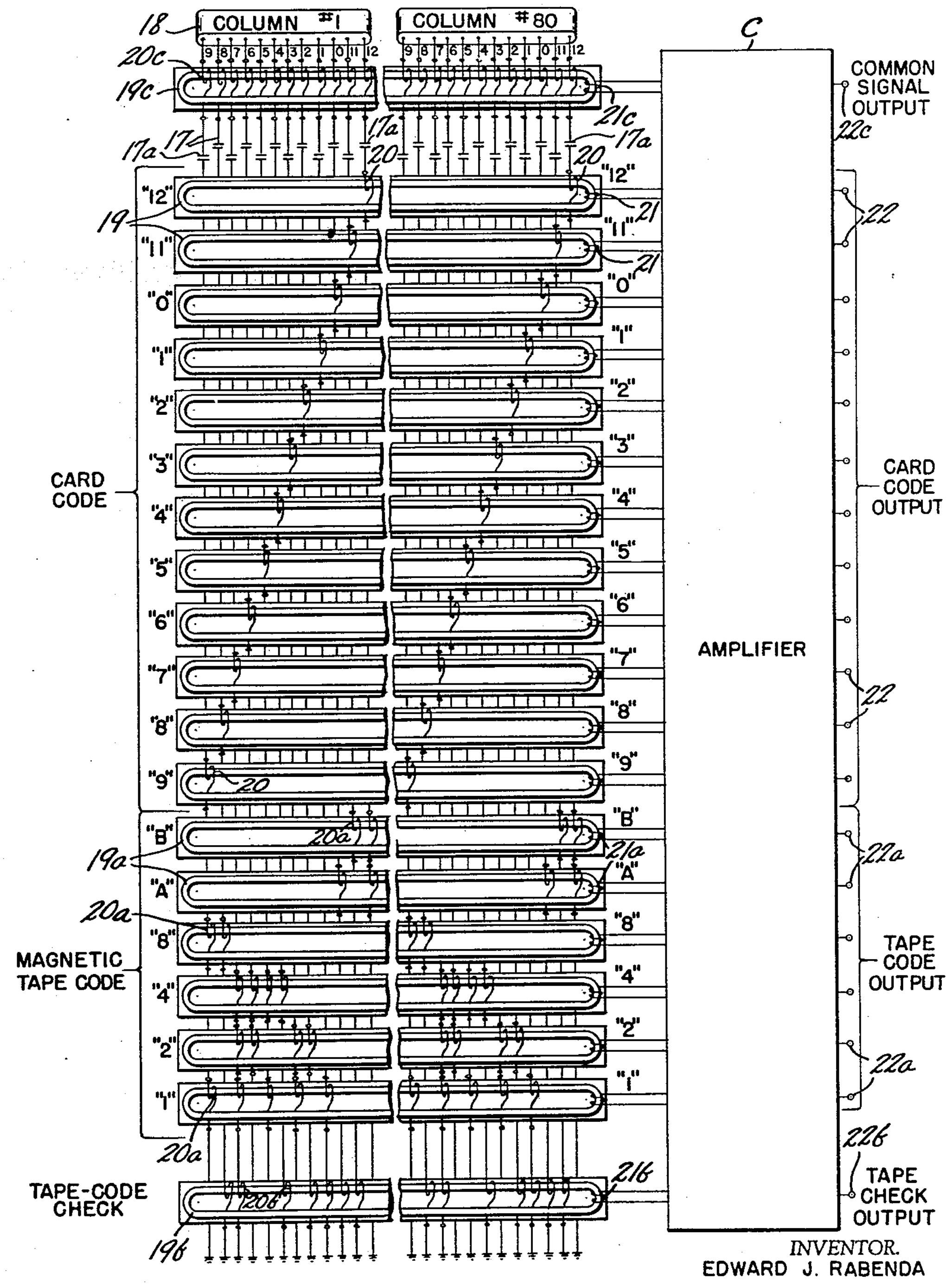
FIG. 5 is a schematic circuit diagram showing a group of magnetic detectors arranged according to the invention.

In card readers arranged according to the invention, a group of conductors is connected between each group of contact elements 12 and the inductron B through a cable 18, thus carrying signals representing all the perforations in a card column simultaneously. Within the inductron B, each of the conductors 17 is carried through windings associated with selected magnetic elements according to the corresponding positions or channels of the desired output code. For example, the inductron illustrated in FIG. 5 is adapted to induce output signals according to both the original twelve-position card code and a different code having fewer positions adapted for recording the same information characters on a typical six-channel magnetic tape at the same time. Thus, twelve magnetic cores 19 corresponding to the twelve column positions are provided, each being wound with eighty input coils 20 connected to the corresponding contact element in each column, only the first and last coils being illustrated for simplicity.

Each of the magnetic cores may be of the nonswitching type adapted to produce a single pulse at an output winding 21 in response to each pulse received through an input coil 20 and, in order to prevent induced pulses from being fed back to the reader through the conductors 17 in other columns when a core is energized, a condenser 17*a* is interposed in each of the conductors. Inasmuch as the twelve brushes in each column are energized simultaneously and the eighty columns are energized in sequence, the card code signals for each character induced in the coils 21 are applied to the amplifier C and appear at corresponding amplifier output terminals 22 simultaneously, and the information recorded on the card is presented character by character.

In addition, a group of six other similar magnetic cores 19*a* is included in the inductron to convert information from the twelve-position card code to a six channel tape code, the channels of which may be represented as "B, A, 8, 4, 2, 1." In order to induce output signals according to the magnetic tape code for each character, the conductors 17 are connected through selected input windings 20*a* on the cores 19*a* to generate appropriate parallel pulses at output coils 21*a*, the corresponding conductors in all the columns being connected to input windings 20*a* on the same cores 19*a* as before. For example, in the typical codes utilized with the illustrated circuit, the character corresponding to a perforation at the "9" position on a card is represented by signals in the "8" and "1" positions in the magnetic tape code. Accordingly, the "9" conductor in the cable 18 is connected to windings 20*a* on the cores 19*a* corresponding to the "8" and "1" magnetic tape channels, thus inducing signals at the "8" and "1" output coils 21*a* and, after amplification, at the corresponding terminals 22*a* when the "9" conductor in any cable 18 is pulsed.

If desired, in order to verify the operation of apparatus responsive to the magnetic tape code, a tape code check signal, such as the well-known redundancy check, for example, may be generated by another magnetic core 19*b* having input windings 20*b* connected to certain of the conductors 17. In the case of the redundancy check, the conductors 17 which generate an odd number of magnetic tape code signals at the terminals 22*a* are connected to an input winding 20*b* to induce an additional pulse at an output winding 21*b* on the core 19*b*. This signal, after amplification, appears at a tape check output terminal 22*b*, thus providing, in combination with the signals at the terminals 22*a*, an even number of parallel code pulses for each character properly recorded on the magnetic tape.

Also, each of the conductors 17 in every column may be connected to another coil 20*c* wound on a core 19*c* to induce a pulse in an output winding 21*c* whenever any card perforation is detected, thus providing a common signal at another amplifier output terminal 22*c* which may be utilized, for example, as a space signal to separate adjacent information characters in a magnetic tape record.

Although the invention has been described herein with reference to specific embodiments, many variations and modifications thereof will occur to those skilled in the art. Accordingly, the invention is not intended to be restricted in scope except as defined by the following claims.

I claim:

1. Apparatus for reading information recorded on a record medium character by character and producing a coded output representing each character comprising a plurality of sensing means adapted to detect a character on the record medium and generate at least one corresponding electrical signal, a plurality of magnetic elements, a corresponding plurality of output winding means each inductively linked to one of the magnetic elements to produce an output signal in response to activation of the corresponding magnetic element, and at least one input winding means on each magnetic element, each input winding means being capable, when energized, of activating the corresponding magnetic element to produce an output signal at the corresponding output winding, each sensing means being connected to transmit signals only to the input winding means on the magnetic elements from which corresponding output signals are required to produce the desired output code.

2. Apparatus according to claim 1 including a tape recorder adapted to record the output signals on a magnetic tape and means for driving the tape recorder and energizing the sensing means in synchronism.

3. Apparatus according to claim 1 including a tape reader for reading magnetic tape and generating signals representing information recorded thereon, a comparer adapted to compare the tape reader signals and the output code signals character by character, and means for driving the tape reader and energizing the sensing means in synchronism.

4. Apparatus according to claim 1 including timing means for energizing all the sensing means of the plurality simultaneously.

5. Apparatus according to claim 1 including a second plurality of magnetic elements corresponding to the information bit positions of a second output code, and coil means inductively linking the sensing means with selected magnetic elements in the second plurality to generate output code signals representing the character detected on the record medium in the second output code.

6. Apparatus according to claim 1 wherein the plurality of magnetic elements is inductively linked to the plurality of sensing means for each column to induce output code signals which differ from the recorded code signals for each character.

7. Apparatus according to claim 6 including another magnetic element and coil means inductively linking selected sensing means of the plurailty for each column thereto, whereby a redundancy check signal for the output code is generated.

8. Apparatus according to claim 1 wherein the record medium comprises a perforated card arranged in a series of columns, each column having a plurality of perforation positions and being perforated at selected positions in a column to represent an information character, and the plurality of sensing means is arranged to detect perforations at the perforation positions of a single column in the card.

9. Apparatus according to claim 1 including a second plurality of sensing means adapted to detect another character at a different location on the record medium, and at least one additional input winding means on each magnetic element, each additional input winding means being capable of activating the corresponding magnetic element to produce an output signal at the corresponding output winding, each sensing means of the second plurality being connected to transmit signals only to the input winding means on the magnetic elements from which corresponding output signals are required to produce the desired output code.

10. Apparatus according to claim 9 including timing means adapted to energize the pluralities of sensing means in sequence.

11. Apparatus according to claim 9 wherein the record medium comprises a perforated card arranged in a series of columns, each column having a plurality of perforation positions and being perforated at selected positions in a column to represent an information character, and each of the pluralities of sensing means is arranged to detect perforations at the perforation positions of a corresponding column in the card.

12. Apparatus according to claim 11 including another magnetic element and coil means inductively linking all the plurality of sensing means in each column thereto, whereby an output signal is generated wherever any perforation is detected.

References Cited in the file of this patent

UNITED STATES PATENTS

| | | |
|---|---|---|
| 2,231,494 | Dickinson | Feb. 11, 1941 |
| 2,912,679 | Bonorden | Nov. 10, 1959 |